(12) United States Patent
Reyes et al.

(10) Patent No.: US 6,527,650 B2
(45) Date of Patent: *Mar. 4, 2003

(54) INTERNAL WEIGHTING FOR A COMPOSITE GOLF CLUB HEAD

(75) Inventors: Herbert Reyes, Laguna Niguel, CA (US); James M. Murphy, Oceanside, CA (US); D. Clayton Evans, San Marcos, CA (US); J. Andrew Galloway, Escondido, CA (US); Daniel R. Jacobson, San Diego, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/947,292

(22) Filed: Sep. 5, 2001

(65) Prior Publication Data

US 2002/0010034 A1 Jan. 24, 2002

Related U.S. Application Data

(63) Continuation-in-part of application No. 09/474,688, filed on Dec. 29, 1999, now Pat. No. 6,386,990, which is a continuation-in-part of application No. 08/958,723, filed on Oct. 23, 1997, now Pat. No. 6,010,411.

(51) Int. Cl.[7] ............................................... A63B 53/04
(52) U.S. Cl. ...................................... 473/345; 473/348
(58) Field of Search ................................ 473/335, 336, 473/345, 347, 348, 349, 344

(56) References Cited

U.S. PATENT DOCUMENTS

| | | | | |
|---|---|---|---|---|
| 4,575,447 A | * | 3/1986 | Hariguchi | 264/512 |
| 5,228,694 A | * | 7/1993 | Okumoto et al. | 473/348 |
| 5,485,998 A | * | 1/1996 | Kobayashi | 473/309 |
| 5,971,867 A | * | 10/1999 | Galy | 473/334 |
| 6,102,813 A | * | 8/2000 | Dill | 473/305 |
| 6,123,627 A | * | 9/2000 | Antonious | 473/327 |
| 6,290,609 B1 | * | 9/2001 | Takeda | 473/335 |
| 6,332,848 B1 | * | 12/2001 | Long et al. | 473/328 |
| 6,386,990 B1 | * | 5/2002 | Reyes et al. | 473/344 |

* cited by examiner

Primary Examiner—Stephen Blau
(74) Attorney, Agent, or Firm—Michael A. Catania

(57) ABSTRACT

A golf club head composed of a composite material and having a plurality of weight members in a ribbon section is disclosed herein. The weight members are composed of a polymer material integrated with a high density metal such as tungsten. Each of the weight members preferably has a mass ranging from 5 grams to 25 grams. The golf club head is preferably composed of plies of pre-preg sheets. The club head preferably has a volume ranging from 175 cubic centimeters to 600 cubic centimeters.

6 Claims, 11 Drawing Sheets

INTERNAL WEIGHTING FOR A COMPOSITE GOLF CLUB HEAD

CROSS REFERENCES TO RELATED APPLICATIONS

This application is a continuation-in-part application of U.S. patent application Ser. No. 09/474,688, filed on Dec. 29, 1999, now U.S. Pat. No. 6,386,990, which is a continuation-in-part application of U.S. patent application No. Ser. 08/958,723, filed on Oct. 23, 1997, now U.S. Pat. No. 6,010,411.

STATEMENT REGARDING FEDERALLY SPONSORED RESEARCH OR DEVELOPMENT

Not Applicable

BACKGROUND OF THE INVENTION

1. Field of the Invention

The present invention relates to a golf club head. More specifically, the present invention relates to a golf club head composed of a composite material.

2. Description of the Related Art

In recent years, substantial attention has been directed toward the development of golf club heads having desired weight characteristics and, in particular, toward the development of golf club heads having a desired center of gravity location. For example, a designer may want to locate the center of gravity of a golf club head in a predetermined or preferred position relative to the face or "sweet spot" of the golf club head so as to make the golf club head more forgiving upon the occurrence of off-center hits.

Because conventional golf club heads are typically made from metal alloys or other materials having a substantially homogeneous density, the weight characteristics of such golf club heads are typically defined by their overall shape. Thus, to alter the location of the center of gravity of a golf club head, it is often necessary to redesign the shape or configuration of the golf club head. However, this may adversely impact other desired characteristics of the golf club head.

The design process may be further complicated where golf club heads are manufactured using composite materials. Because composite materials are typically less dense than metal and other conventional materials, composite golf club heads generally require additional weighting to achieve desired swing weights for finished golf clubs.

The Rules of Golf, established and interpreted by the United States Golf Association ("USGA") and The Royal and Ancient Golf Club of Saint Andrews, set forth certain requirements for a golf club head. The requirements for a golf club head are found in Rule 4 and Appendix II. A complete description of the Rules of Golf are available on the USGA web page at www.usga.org. Although the Rules of Golf do not expressly state specific parameters for a golf club, Rule 4-1d states that the club head shall be generally plain in shape, and all parts shall be rigid, structural in nature and functional.

Many solutions have been proposed to adjust and/or increase the weight of composite golf club heads. For example, a weighting agent or material is often introduced into a cavity within a golf club head subsequent to manufacture. In the case of wood type golf club heads, the cavity may be enclosed by the face, sides, sole and crown of the golf club head. However, it is not uncommon for cavities also to be formed, for example, in the sole, heel or toe regions of iron or putter type golf club heads. Because of limited access to the cavities, however, such weighting materials may not be placed as precisely as desired and may not provide the ability to adjust the weight of the golf club heads, or the location of the center of gravity of the golf club heads, very precisely. Furthermore, such materials may dry and separate from the walls of the golf club heads during use, adversely affecting the weight of the golf club heads and possibly creating a distracting sound or feel when the golf clubs are swung.

Alternatively, a composite golf club head may be provided with a metal sole plate or, in the case of wood type golf club heads, a solid or foam core. However, the use of metal sole plates may add undesirable steps in the process of making the golf club heads, and the use of solid or foam core materials has been shown generally to be ineffective for adjusting the location of the center of gravity and moments of inertia of golf club heads. The reason for this is that solid or foam core materials generally have a uniform density, making it difficult to adjust the location of the center of gravity or moments of inertia of the golf club head without simultaneously altering the shape or configuration of the golf club head. Additionally, such materials may result in voids within the golf club head.

For a golf club head including composite material, higher density layers of composite fiber may be provided in the wall of the golf club head to increase its weight. However, such changes in the layers of composite material may affect the structural characteristics of the golf club head.

In view of the foregoing, there appears to be a substantial need for improved methods of manufacturing composite golf club heads and, in particular, for methods that allow for more effective adjustment of the weight characteristics of golf club heads without substantially affecting the structural characteristics of the golf club heads.

BRIEF SUMMARY OF THE INVENTION

The present invention provides a solution for adding mass to a relatively lightweight composite body of a golf club head. This unique and novel solution allows for manipulation of the center of gravity and moments of inertia of the golf club head in order to provide a golf club head that is better performing and more forgiving than similar golf club heads of the prior art.

One aspect of the present invention is a golf club head having a composite body and a plurality of weight members. The body has a hollow interior and is composed of a plurality of plies of pre-preg material. The body has a striking plate, a crown and a sole with a bottom portion and a ribbon. The body has a volume ranging from 200 cubic centimeters to 450 cubic centimeters and a mass ranging from 80 grams to 120 grams. The plurality of weight members are embedded between the plurality of plies of pre-preg material in the ribbon. Each of the plurality of weight members is composed of a polymer material integrated with a metal material. Each of the plurality of weight members has a density ranging from 5 grams per cubic centimeter to 20 grams per cubic centimeter. The plurality of weight members have a combined mass ranging from 40 grams to 70 grams. The golf club head has a mass ranging from 170 grams to 250 grams.

Another aspect of the present invention is a golf club head that has a moment of inertia ranging from 2500 grams-centimeter squared to 3500 grams-centimeter squared about the Izz axis through the center of gravity. The golf club head has a body and a plurality of weight members. The body has a hollow interior and is composed of a plurality of layers of plies of pre-preg material. The body has a striking plate, a crown and a sole with a bottom portion and a ribbon with an upper wall and a lower wall. The body has a volume ranging from 300 cubic centimeters to 400 cubic centimeters and a mass ranging from 90 grams to 115 grams. The plurality of weight members are embedded between the plurality of plies of pre-preg material in the upper wall of the ribbon. Each of the plurality of weight members is composed of a polyurethane material integrated with tungsten. Each of the plurality of weight members has a density ranging from 5 grams per cubic centimeter to 10 grams per cubic centimeter. The plurality of weight members have a combined mass ranging from 40 grams to 60 grams, and the golf club head has a mass ranging from 170 grams to 220 grams.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
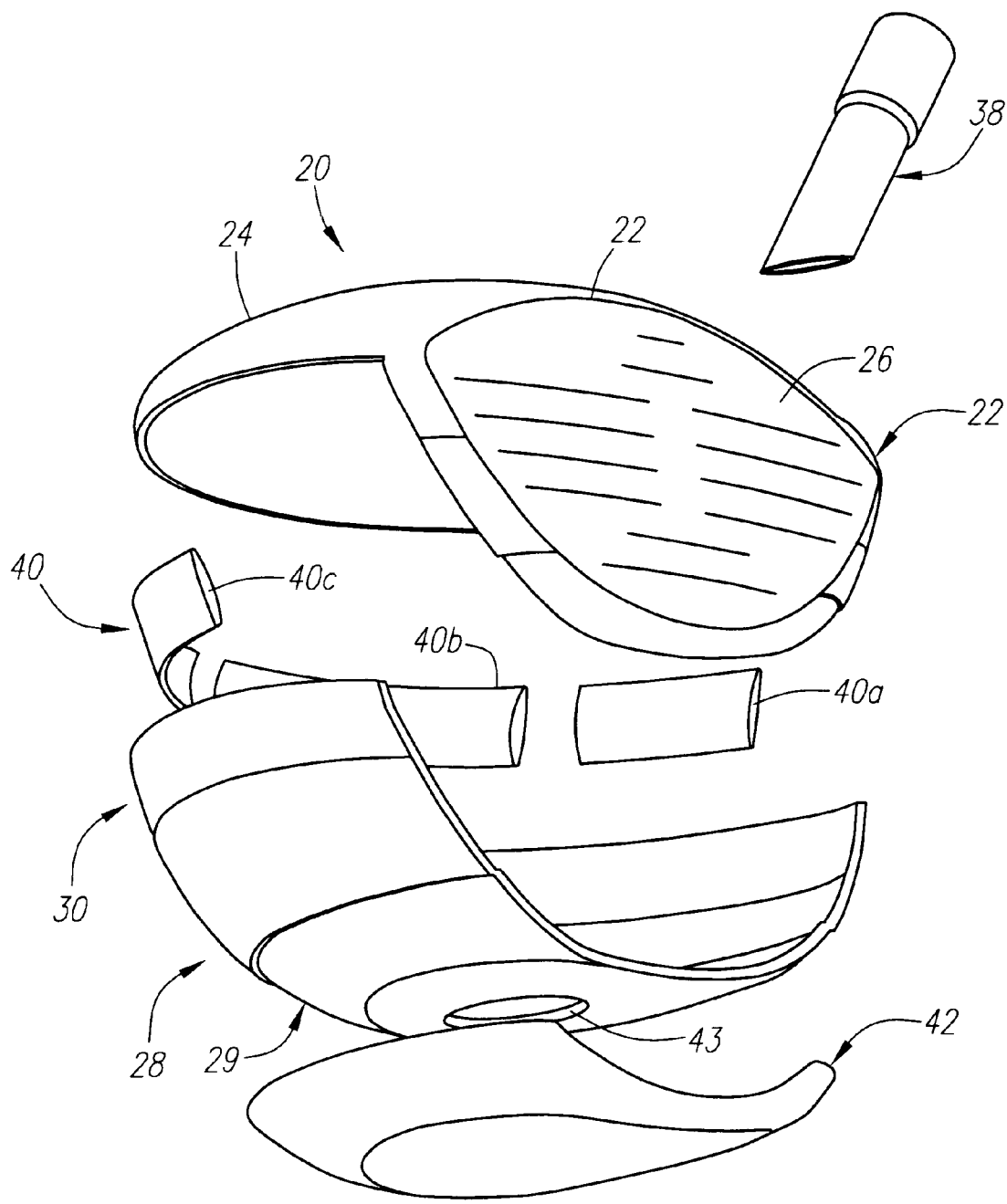
FIG. 1 is an exploded view of a golf club head of the present invention.

As shown in FIGS. 1–6, a golf club head of the present invention is generally designated 20. The club head 20 is either a fairway wood or a driver. The loft angle of the drivers preferably ranges from six degrees to fifteen degrees. The club head 20 has a body 22 that is generally composed of a composite material such as plies of carbon pre-preg sheets, as will be explained in further detail below. The body 22 has a crown 24, a striking plate 26, a sole 28 with a bottom portion 28a and a ribbon 30. The ribbon preferably has an upper ribbon wall 30a and a lower ribbon wall 30b. The ribbon 30 generally extends from a toe end 32 to a heel end 34. The ribbon 30 generally begins at one end of the striking plate 26 and ends at an opposite end of the striking plate 26. A rear 36 of the body 22 is opposite the striking plate 26 and is defined by portions of the ribbon 30, the crown 24 and the sole 28. Also, at the heel end 34 of the club head 20 is an internal tube 38 with an opening 39 for placement of a shaft therein. The internal tube 38 is placed within the hollow interior 44 of the body 22. Within the ribbon 30 is a plurality of weight members 40a–c for providing mass for the golf club head 20.

A sole plate 42 is disposed within a recess 29 of the bottom portion 28a of the sole 28. The sole plate 42 is preferably composed of a metal material such as aluminum or titanium, and preferably has a mass of 5 grams to 20 grams. A preferred mass for an aluminum sole plate 42 is approximately 11 grams, and a preferred mass for a titanium sole plate 42 is approximately 18 grams. The sole plate 42 is preferably bonded within the recess 29 through use of adhesives. The sole plate 42 preferably has embossed graphics thereon. The sole plate 42 increases the durability of the club head 20 since the sole 28 often impacts the ground during the striking of a golf ball.

The club head 20 of the present invention also has a greater volume than a composite club head of the prior art while maintaining a weight that is substantially lower or equivalent to that of the prior art. The volume of the club head 20 of the present invention ranges from 175 cubic centimeters to 600 cubic centimeters, more preferably ranges from 300 cubic centimeters to 400 cubic centimeters, and is most preferably 360 cubic centimeters for a driver. The mass of the club head 20 of the present invention ranges from 165 grams to 300 grams, preferably ranges from 175 grams to 225 grams, and most preferably from 188 grams to 195 grams. The body 22, when composed of plies of pre-preg material, has a mass ranging from 80 grams to 120 grams, and most preferably a mass of 98 grams. Thus, it is necessary to provide mass to the relatively lightweight body 22 by addition of the weight members 40a–c.

The volume of the present invention is increased by increasing the vertical distance of the club head 20 from the sole 28 to the crown 24, as opposed to the horizontal distance of the heel end 34 to the toe end 32. In preferred embodiments, this increase in volume is brought about by the dual wall structure of the ribbon 30. The upper ribbon wall 30a is approximately perpendicular relative to the crown 24, while the lower ribbon wall 30b preferably has angle between 25 degrees to 75 degrees relative to the crown 24. The greater volume of the club head 20 allows the club head 20 to be more forgiving than prior art golf club heads while providing better performance. The mass of club head 20, even with the weight members 40a–c, is much lower than metal club heads of similar volumes, and thus the large volume does not deter from the swing of a golfer, particularly a low swing speed golfer.

Figure 2:
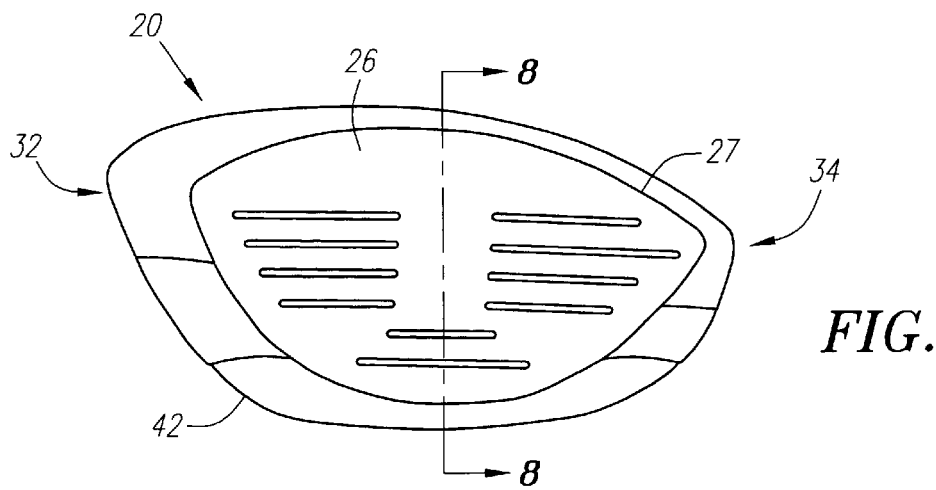
FIG. 2 is a front view of a golf club head of the present invention.
Figure 2A:
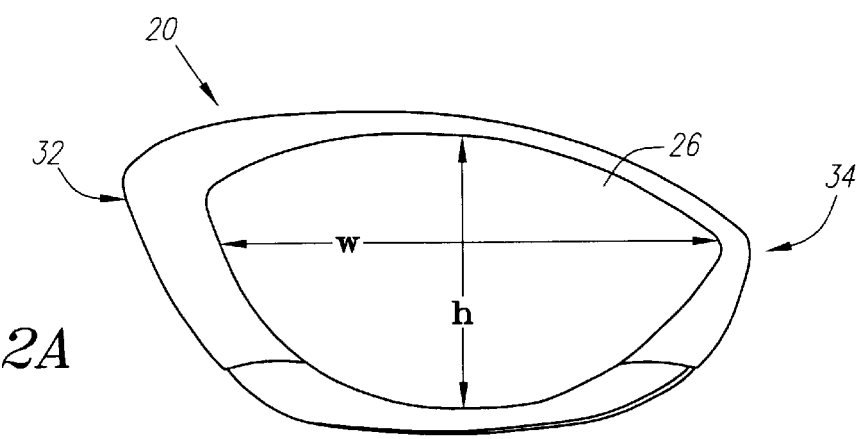
FIG. 2A is a front view of a golf club head of the present invention.
Figure 3:
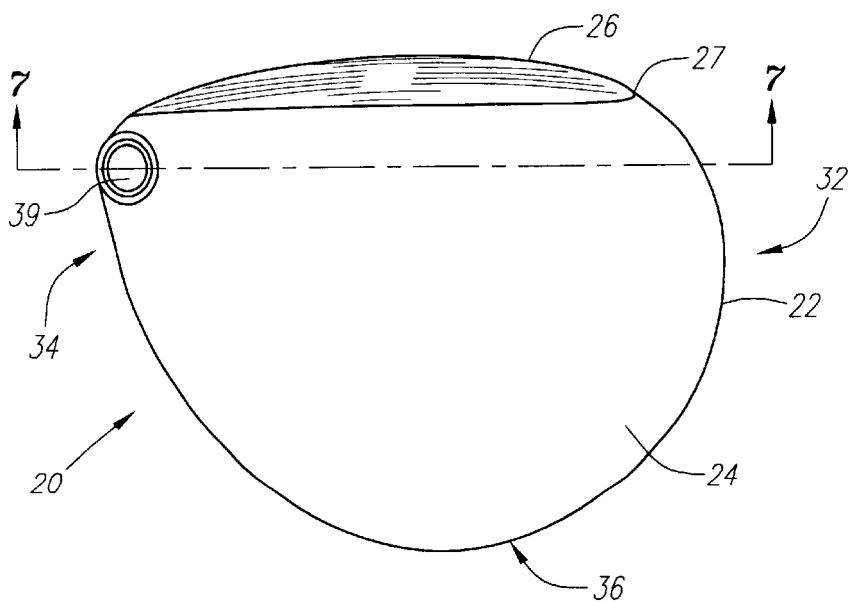
FIG. 3 is a top plan view of a golf club head of the present invention.
Figure 4:
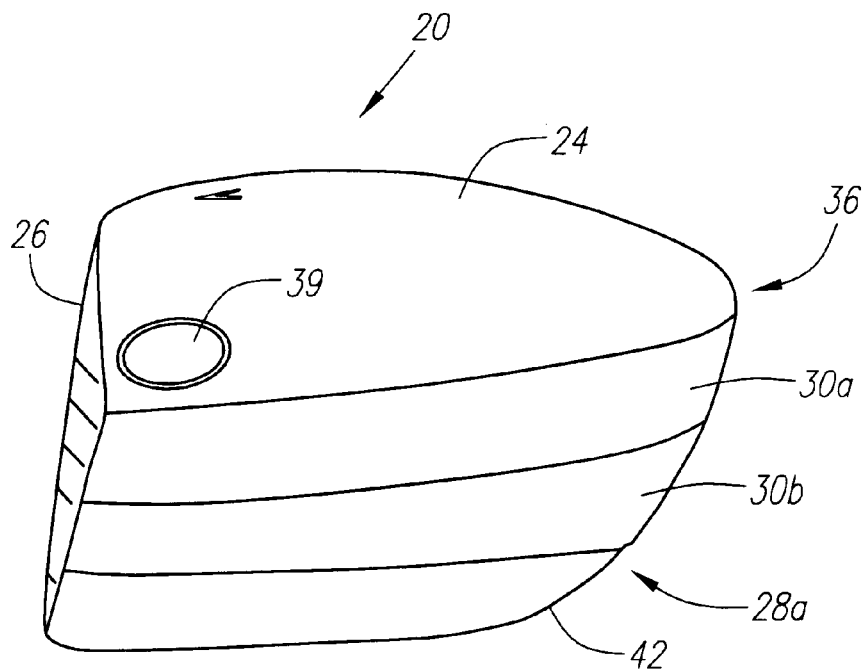
FIG. 4 is a heel end view of a golf club head of the present invention.
Figure 5:
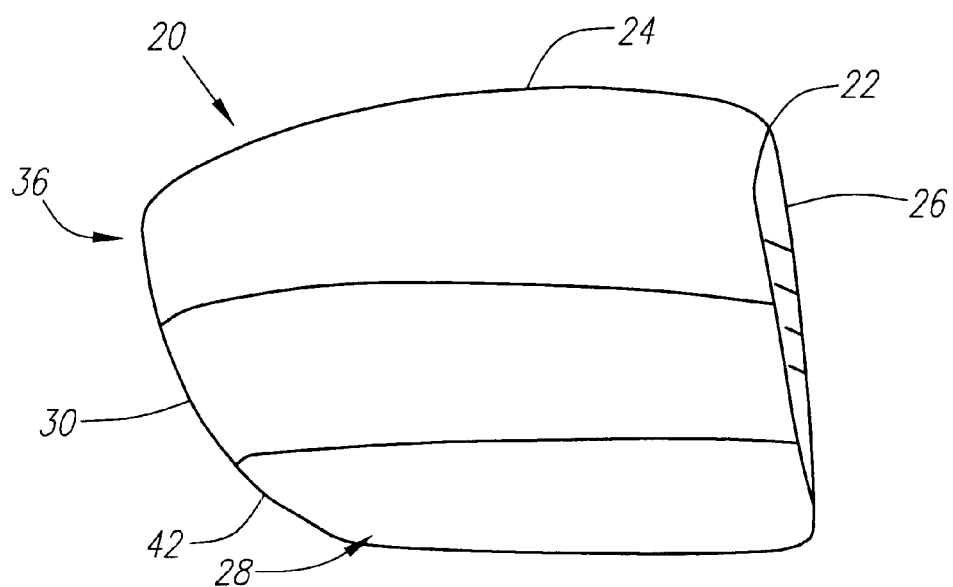
FIG. 5 is a toe end view of a golf club head of the present invention.
Figure 6:
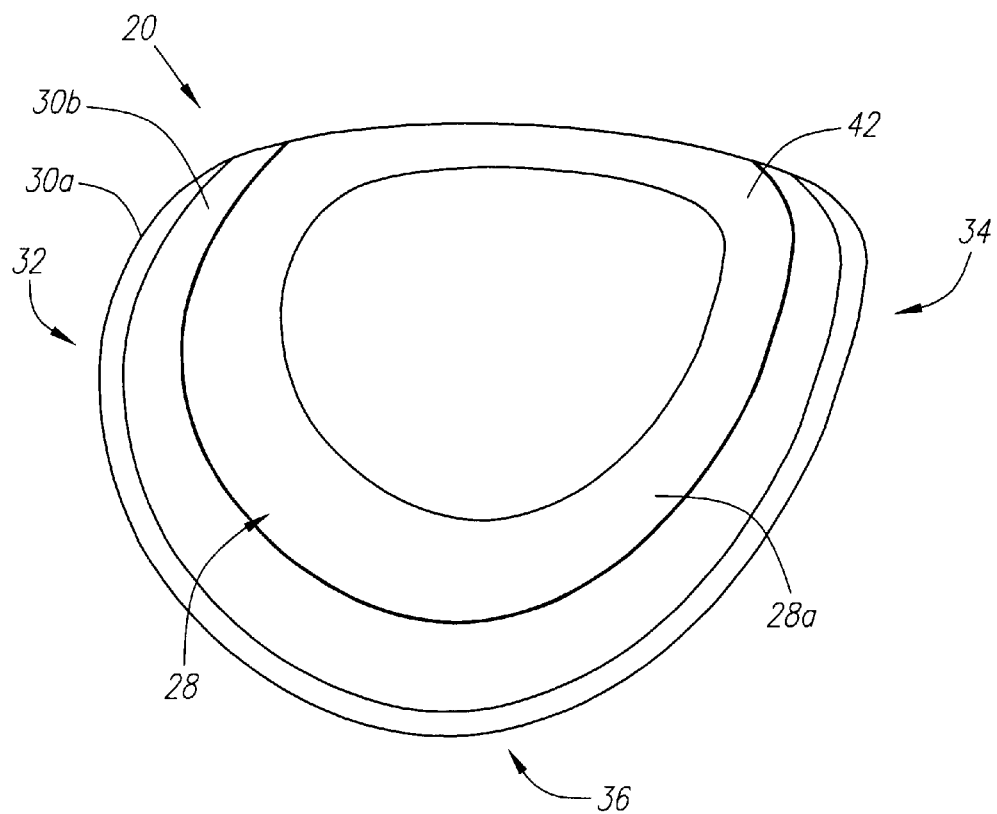
FIG. 6 is a bottom plan view of a golf club head of the present invention.

The striking plate 26 has a smaller aspect ratio than striking plates of the prior art. The aspect ratio as used herein is defined as the width, "w", of the striking plate divided by the height, "h", of the striking plate 26, as shown in FIG. 2A. In one embodiment, the width w is 90 millimeters and the height h is 54 millimeters giving an aspect ratio of 1.666. In conventional golf club heads, the aspect ratio is usually much greater than 1. For example, the original GREAT BIG BERTHA® driver from Callaway Golf Company had an aspect ratio of 1.9. The aspect ratio of the present invention preferably ranges from 1.0 to 1.7. In one embodiment, the face area of the striking plate 26 is 5.8 square inches, which provides for a larger hitting area for high handicap players.

Figure 7:
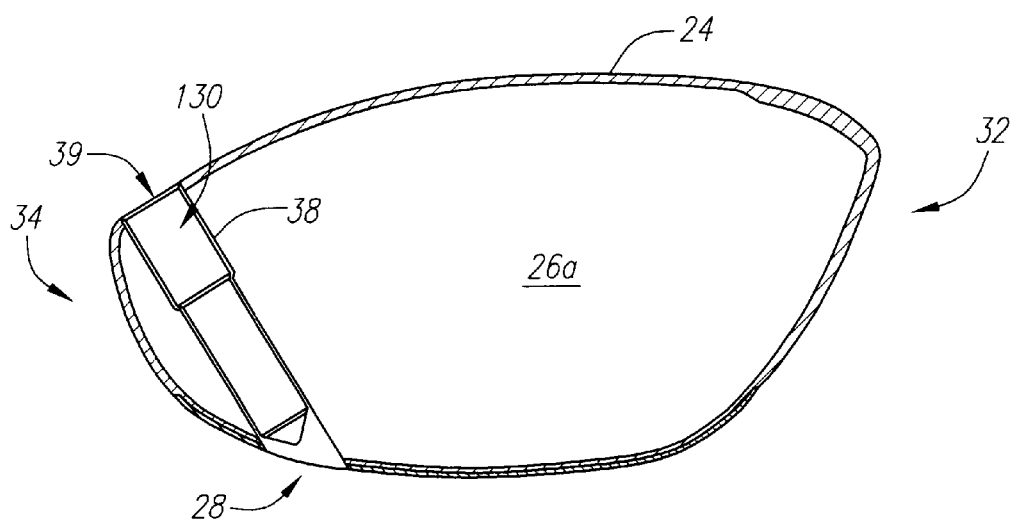
FIG. 7 is a cross-sectional view of the golf club head of FIG. 3 along line 7—7.

As shown in FIG. 7, the internal tube 38 lies within the hollow interior 44 of the club head 20. The internal tube is preferably composed of a metal material and has a mass ranging from 8 grams to 20 grams. The internal tube 38 is most preferably composed of stainless steel and has a mass of approximately 14 grams. The internal tubing 38 has a bore 130 to receive an insert and a shaft, not shown, therein. Such an insert is discussed in U.S. Pat. No. 6,352,482, filed on Aug. 31, 2000, for a Golf Club With Hosel Liner, which is hereby incorporated by reference in its entirety. Preferably, the club head 20 has a hollow interior 44 defined by the body 22, however, the light weight of the composite body 22 allows for numerous manipulations in placement of weight, foam, sound enhancing devices and the like within the hollow interior 44.

In a preferred embodiment, the club head 20 has three weight members, a heel weight member 40a, a center weight member 40b and a toe weight member 40c, all disposed within the plies of pre-preg that compose the ribbon 30 of the club head 20. The combined mass of the weight members 40a–c range from 30 grams to 80 grams, more preferably 45 grams to 70 grams, and most preferably 54 grams. Individually, each of the weight members 40a–c has a mass ranging from 10 grams to 30 grams, preferably from 14 grams to 25 grams, and more preferably from 15 grams to 20 grams. Each of the weight members 40a–c has a density ranging from 5 grams per cubic centimeters to 20 grams per cubic centimeters, more preferably from 7 grams per cubic centimeters to 12 grams per cubic centimeters, and most preferably 8.5 grams per cubic centimeters.

Each of the weight members 40a–c is preferably composed of a polymer material integrated with a metal material. The metal material is preferably selected from copper, tungsten, steel, aluminum, tin, silver, gold, platinum, or the like. A preferred metal is tungsten due to its high density. The polymer material is a thermoplastic or thermosetting polymer material. A preferred polymer material is polyurethane, epoxy, nylon, polyester, or similar materials. A most preferred polymer material is a thermoplastic polyurethane. A preferred weight member 40 is an injection molded thermoplastic polyurethane integrated with tungsten to have a density of 8.5 grams per cubic centimeters. In a preferred embodiment, each of the weight members 40a–c are composed of from 60 to 95 volume percent polyurethane and from 40 to 5 volume percent tungsten. Also, in a preferred embodiment, each of the weight members 40a–c are composed of from 10 to 25 volume percent polyurethane and from 90 to 75 weight percent tungsten.

Preferably, the weight members 40a–c extend from approximately the heel end 34 of the striking plate 26 through the rear 36 to the toe end 32 of the striking plate 26. However, the weight members 40a–c may only extend along the rear 36 of the ribbon 30, the heel end 34 of the ribbon 30, the toe end 32 of the ribbon 30, or any combination thereof. Also, the weight members 40a–c may be positioned parallel to each other as opposed to being positioned in series. Those skilled in the pertinent art will recognize that other weighting materials may be utilized for the weight members 40a–c without departing from the scope and spirit of the present invention.

The placement of the weighting members 40a–c allows for the moment of inertia of the golf club head 20 to be optimized. A more thorough description of the optimization of the moments of inertia is disclosed in co-pending U.S. patent application No. Ser. 09/796,951, filed on Feb. 27, 2001, entitled High Moment of Inertia Composite Golf Club, and hereby incorporated by reference in its entirety. In one preferred example of the golf club head 20 of the present invention, the moment of inertia about the Ixx axis through the center of gravity is approximately 2566 grams-centimeters squared ("g-cm$^2$"), the moment of inertia about the Iyy axis through the center of gravity is approximately 1895 g-cm$^2$, and the moment of inertia about the Izz axis through the center of gravity is approximately 3368 g-cm$^2$.

Figure 8:
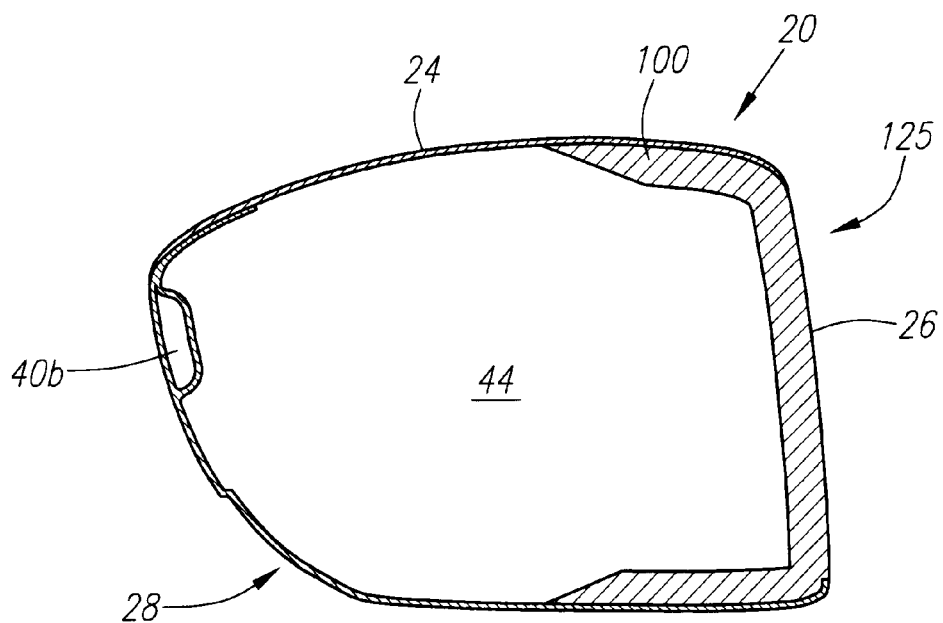
FIG. 8 is a cross-sectional view of the golf club head of FIG. 2 along line 8—8.
Figure 9:
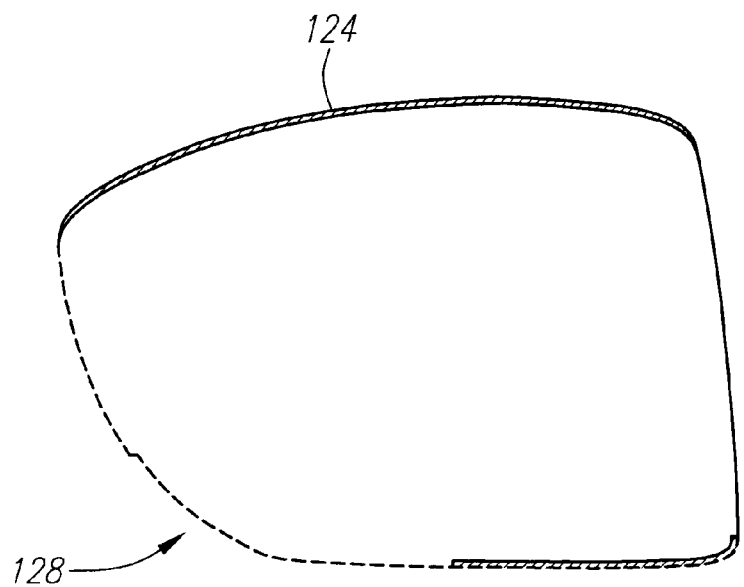
FIG. 9 is a cross-sectional view of a face-crown ply of a golf club head of the present invention.
Figure 10:
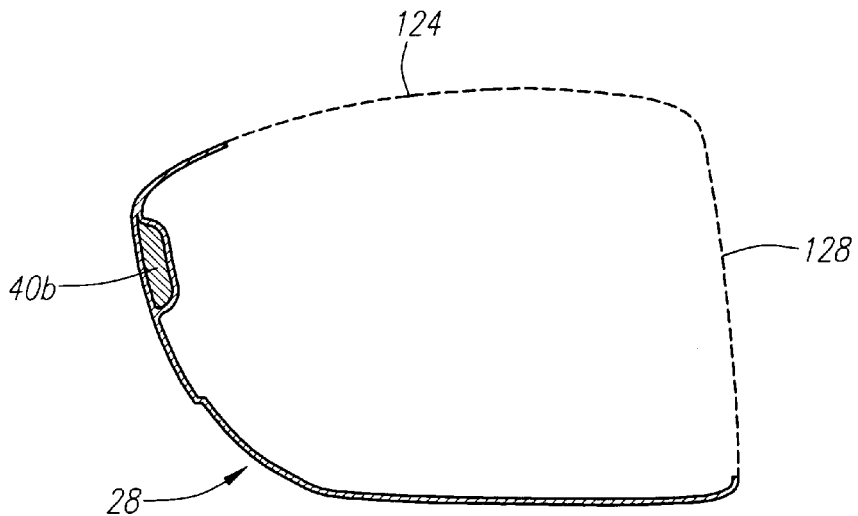
FIG. 10 is a cross-sectional view of a sole preform with an internal weight member of a golf club head of the present invention.

As shown in FIGS. 8–10, the body 22 is preferably manufactured from a face preform 125, which includes the striking plate portion 26 and a return portion 100, a crown preform 124 and a sole preform 128. The crown preform 124 overlaps the face component 125, as shown in FIG. 9. The sole component 128 includes the ribbon portion 30 and the bottom portion 28a. The sole component 128 is attached to the crown component 124 and the face component 125.

Figure 12:
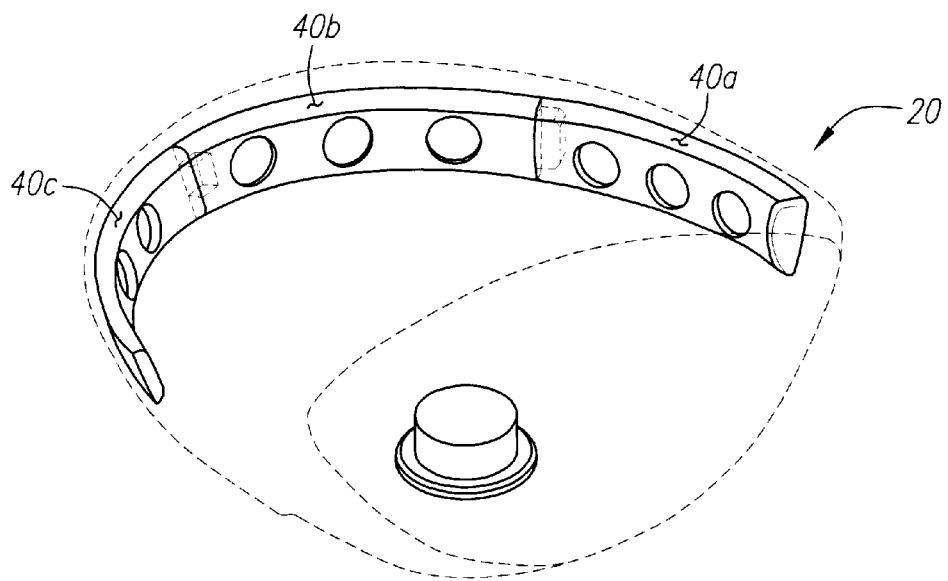
FIG. 12 is an isolated view of the internal weighting with a golf club head in phantom lines.

In preferred embodiment, the weight members 40a–c are co-cured within the ribbon 30. The weight members 40a–c are positioned along a single horizontal plane defined by the upper ribbon wall 30a, as shown in FIG. 12. However, those skilled in the pertinent art will recognize that each weight member 40a–c may be positioned along different horizontal planes.

In an alternative embodiment, multiple weight members 40 (more than four) are evenly distributed along the entire length of the ribbon 30. Those skilled in the pertinent art will recognize that numerous variations for the weight members 40 are possible without departing from the scope and spirit of the present invention.

As previously stated, the preferred composite material is plies of carbon pre-preg sheets. Plies of pre-preg composite sheets are manufactured by pulling strands of fiber in a parallel motion, preferably carbon or glass fiber, through a resin film and allowing the resin to partially cure or "stage". When the resin is partially staged, the resin holds the fibers together such that the fibers form a malleable sheet with all of the fibers in a specific orientation relative to an edge of the sheet. Exemplary carbon pre-preg fiber sheets may be obtained from Newport Composites of Santa Ana, Calif., Fiberite Inc. of Greenville, Tex., or Hexcel Inc. of Pleasonton, Calif. Alternatively, the plies of the body 22 may comprise a plurality of plies of composite fiber without any resin, each typically comprising a continuous fiber braid or mat, that are used to make a dry reinforcement preform, as described in U.S. Pat. No. 6,010,411, filed on Oct. 23, 1997, which is hereby incorporated by reference in its entirety.

The body 22 may include one or more plies of pre-preg that define structurally the various walls of the golf club head 20. The plies of pre-preg composite sheet are selected and included in the various walls of the golf club head 20 based upon the structural characteristics desired for a finished golf club head. Numerous configurations are possible and one such configuration is set forth in U.S. Pat. No. 6,248,025, filed on Dec. 29, 1999, entitled A Composite Golf Club Head And Manufacturing Method, which is hereby incorporated by reference in its entirety.

Figure 11:
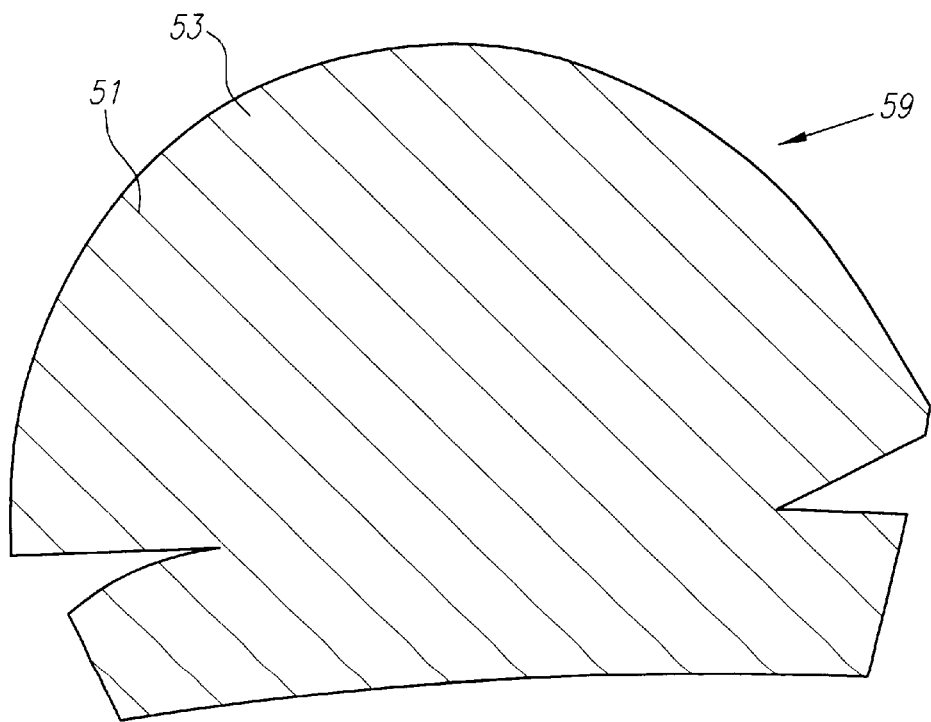
FIG. 11 is a plan view of a sole ply of a golf club head of the present invention.

In a fabrication process, such as the process set forth in U.S. Pat. No. 6,248,025, the plies of pre-preg and the weight members 40a–c are applied to a forming mold in a predetermined manner to create a sole preform. Preferably, one or more layers of plies of pre-preg having a selected shape and mass are first applied to predetermined locations on the forming mold. Such a sole ply pre-preg sheet 59 is illustrated in FIG. 11. The sole ply 59 has a plurality of fibers 51 dispersed within a resin body 53. The fibers 51 extend at a forty-five degree angle relative to the ground when it is in a position for striking a golf ball thereby imparting the sole ply 59 with a forty-five degree orientation. The weight members 40a–c are then placed within the ribbon section of the sole preform. Then, the plies of pre-preg are applied over the weight members 40a–c, thereby resulting in the weight members 40a–c being embedded in the ribbon 30 of the sole preform of the body 22.

Alternatively, plies of pre-preg are not placed over the weight members 40a–c resulting in the weight members 40a–c having one surface co-cured to the interior wall of the ribbon 30 of the body 22, and another surface exposed to the hollow interior 44.

Figure 13:
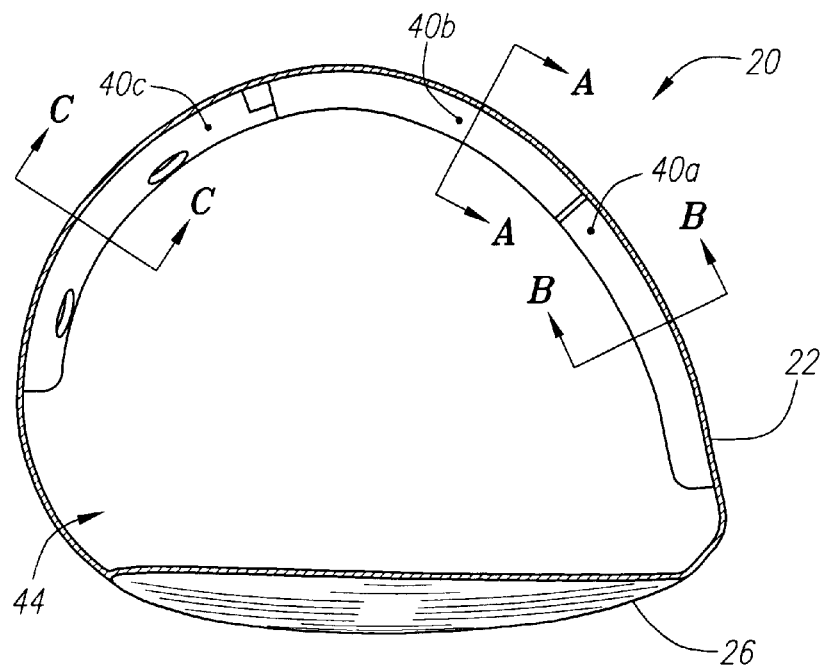
FIG. 13 is a top plan view of a golf club head of the present invention with the crown not shown to illustrate the internal weighting.
Figure 13A:
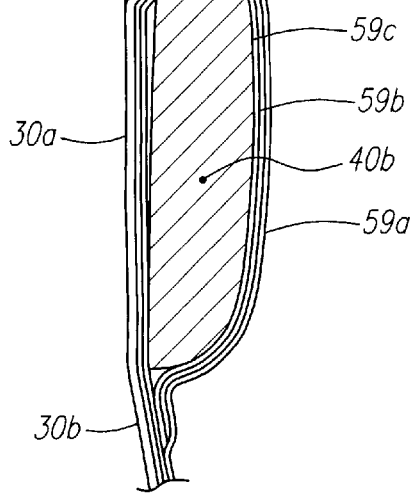
FIG. 13A is a cross-sectional view along line A—A of FIG. 13.
Figure 13B:
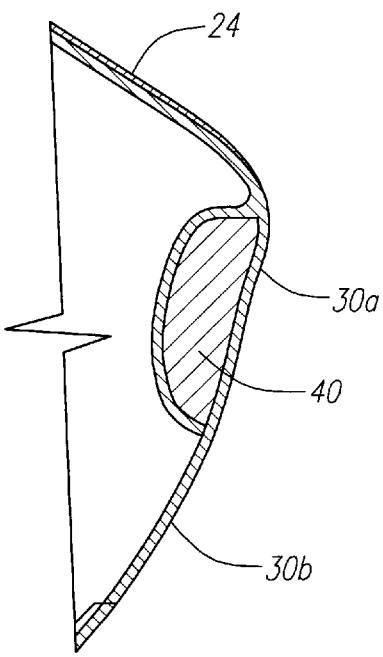
FIG. 13B is a cross-sectional view along line B—B of FIG. 13.
Figure 13C:
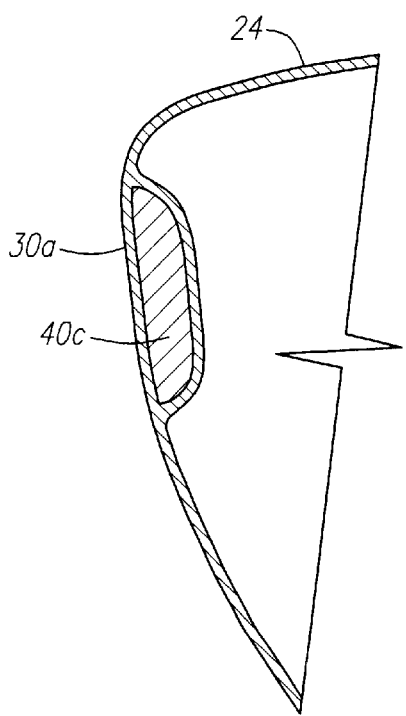
FIG. 13C is a cross-sectional view along line C—C of FIG. 13.

As shown in FIGS. 13, 13A, 13B and 13C, the heel weight member 40a, the center-rear weight member 40b and the toe weight member 40c are connected to each other to form a single connected weight strip that bulges inward from the wall of the body 22 toward the hollow interior 44 of the body 22. The heel weight 40a extends closer to the striking plate 26 than the toe weight member 40c thereby imparting a heel bias. As shown in FIG. 13A, plies 59a, 59b and 59c are wrapped around the weight member 40b thereby embedding the weight member 40b within the upper ribbon wall 30a.

FIGS. 14–22 illustrate isolated views of the weight members 40a–c. Each weight member 40a–c has a length, Lw, that generally ranges from 1.5 inches to 3.0 inches, more preferably from 2.0 inches to 2.75 inches, and most preferably 2.5 inches. Each weight member 40a–c has a height, Hw, that generally ranges from 0.25 inch to 1.0 inch, more preferably from 0.35 inch to 0.75 inch, and most preferably 0.5 inch. The preferred thickness of each of the weight members 40a–c is approximately 0.095 inch.

Each weight member 40a–c has a plurality of density adjustment pins 160a–c which allows the mass of each weight member 40a–c to be adjusted according to the depth of each of the density adjustment pins 160a–c. Each of the density adjustment pins 160a–c preferably allows for a ±5 grams adjustment to each of the weight members 40a–c. The greater the depth of a density adjustment pin 160, the lower the mass of the weight member 40. Each of the density adjustment pins 160a–c may have varying depths in order to create a weight member 40 with a particular mass. Typically, each of the density adjustment pins 160a–c has a depth of 5/16 of an inch. Each of the density adjustment pins 160a–c is integral with their corresponding weight member 40 and thus the mass of each weight member 40 is fixed. Thus, one would substitute weight members 40 to change the mass of the golf club head 20. Those skilled in the pertinent art will recognize that a weight member 40 may have more than three density adjustment pins 160 without departing from the scope and spirit of the present invention.

Figure 14:
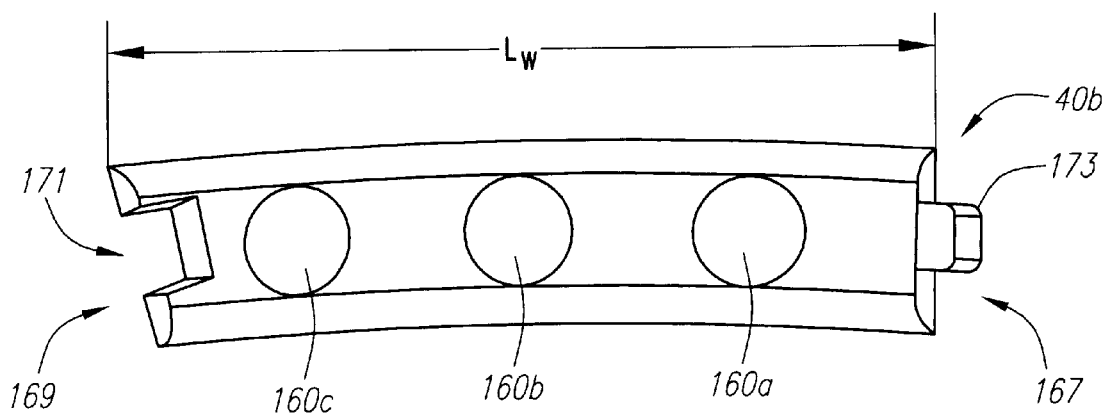
FIG. 14 is an isolated front view of a center weight member.
Figure 15:
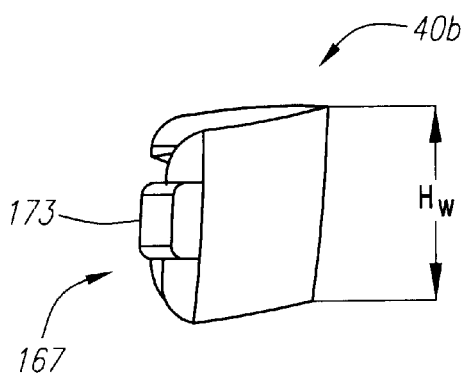
FIG. 15 is a side view of a center weight member.
Figure 16:
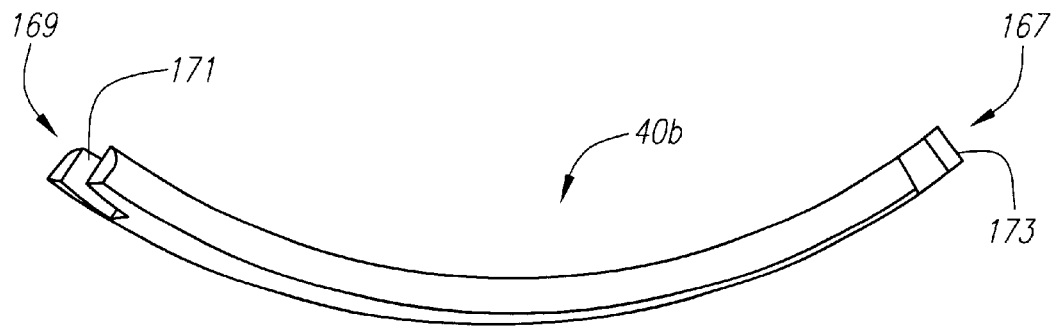
FIG. 16 is a top view of a center weight member.
Figure 17:
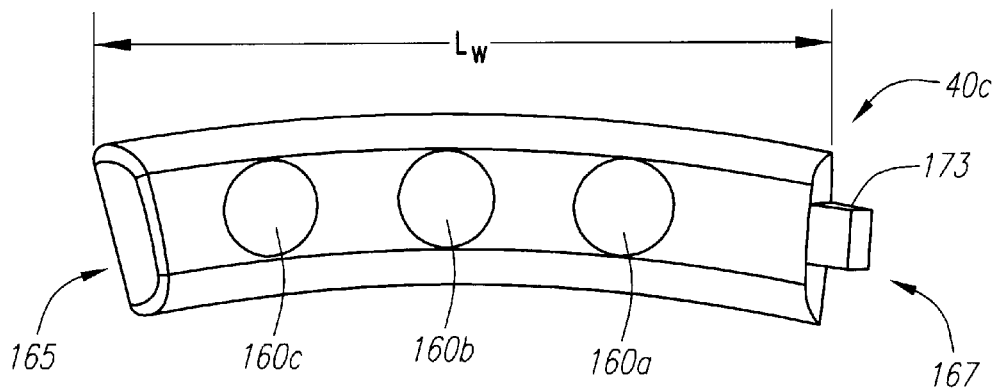
FIG. 17 is an isolated front view of a toe weight member.
Figure 18:
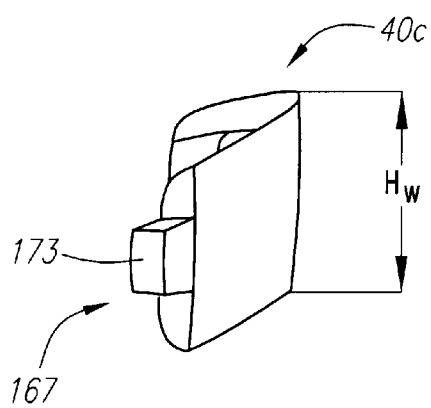
FIG. 18 is a side view of a toe weight member.
Figure 19:
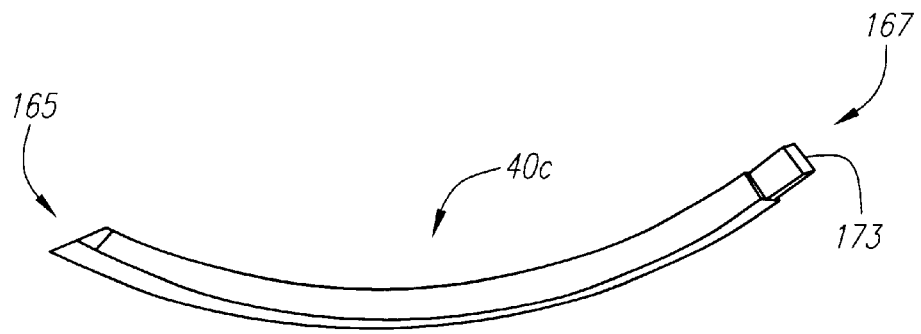
FIG. 19 is a top view of a toe weight member.
Figure 20:
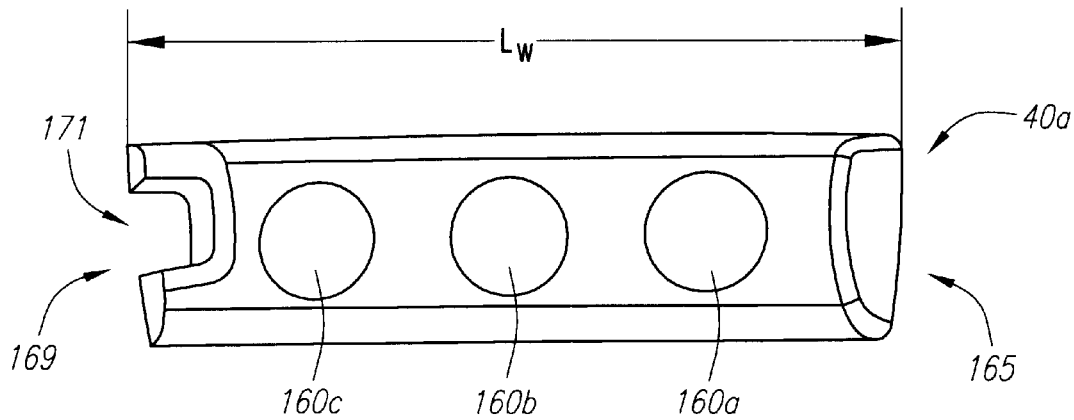
FIG. 20 is an isolated front view of a heel weight member.
Figure 21:
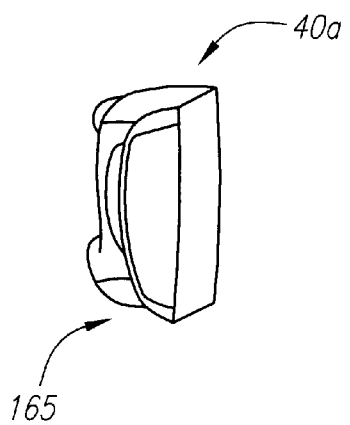
FIG. 21 is a side view of a heel weight member.
Figure 22:
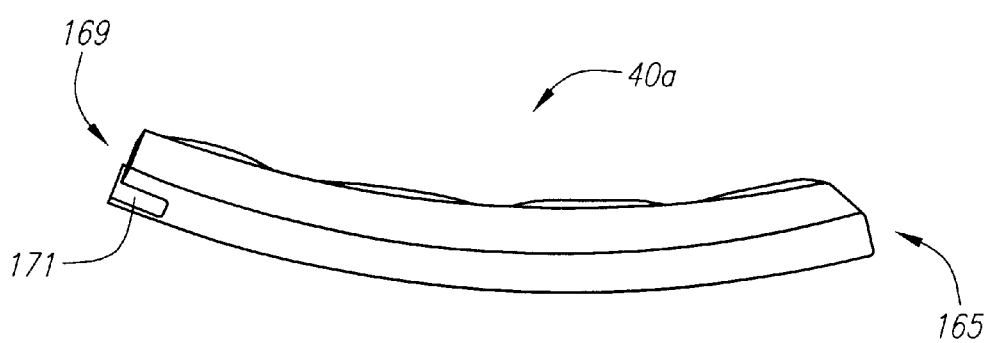
FIG. 22 is a top view of a heel weight member.

As shown in FIGS. 14–16, the center rear weight member 40b has a projection end 167 and a recess end 169. The projection end 167 has a projection 173 extending therefrom for connection to the heel weight member 40a. The recess end 169 has a recess 171 therein for connection to the toe weight member 40c. In a preferred embodiment, the recess 171 is approximately 0.23 inch in length and 0.15 inch in depth. As shown in FIGS. 17–19, the toe weight member 40c has a projection end 167 and a flat end 165. The projection end 167 has a projection 173 extending therefrom for connection to the center rear weight member 40b. As shown in FIGS. 20–22, the heel weight member 40a has a recess end 169 and a flat end 165. The recess end 169 has a recess 171 therein for connection to the center rear weight member 40b. In a preferred embodiment, the heel weight member 40a has a mass of 21.4 grams, the center weight member 40b has a mass of 16.53 grams, and the toe weight member 40c has a mass of 16.53 grams.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A wood-type golf club head comprising:
    a body having a hollow interior and composed of a plurality of plies of pre-preg material, the body having a striking plate, a crown, a sole with a bottom portion and a ribbon, wherein the striking plate, the crown and the sole define the hollow interior, the body having a volume ranging from 300 cubic centimeters to 450 cubic centimeters and a mass ranging from 80 grams to 120 grams; and
    a plurality of weight members embedded between the plurality of plies of pre-preg material in the ribbon, each of the plurality of weight members composed of a polyurethane material integrated with tungsten, each of the plurality of weight members having a density ranging from 7 grams per cubic centimeters to 12 grams per cubic centimeters, the plurality of weight members having a combined mass ranging from 40 grams to 70 grams, wherein the plurality of weight members consists of a toe weight member, a heel weight member and a center weight member, each of the plurality of weight members having a length that ranges from 1.5 inches to 3.0 inches and a height that ranges from 0.25 inch to 1.0 inch;
    wherein the wood-type golf club head has a mass ranging from 170 grams to 250 grams.

2. The wood-type golf club head according to claim 1 wherein each of the weight members is composed of from 60 to 95 volume percent polyurethane and from 40 to 5 volume percent tungsten.

3. The wood-type golf club head according to claim 1 wherein each of the weight members is composed of from 10 to 25 weight percent polyurethane and from 90 to 75 weight percent tungsten.

4. A wood-type golf club head comprising:
a body having a hollow interior and composed of a plurality of plies of pre-preg material, the body having a striking plate, a crown, a sole with a bottom portion and a ribbon with an upper wall and a lower wall, wherein the striking plate, the crown and the sole define the hollow interior, the body having a volume ranging from 300 cubic centimeters to 400 cubic centimeters and a mass ranging from 90 grams to 115 grams; and
a plurality of weight members embedded between the plurality of plies of pre-preg material in the upper wall of the ribbon, each of the plurality of weight members composed of a polyurethane material integrated with tungsten, each of the plurality of weight members having a density ranging from 7 grams per cubic centimeter to 12 grams per cubic centimeter, the plurality of weight members having a combined mass ranging from 40 grams to 60 grams, wherein the plurality of weight members consists of a toe weight member, a heel weight member and a center weight member each of the plurality of weight members having a length that ranges from 1.5 inches to 3.0 inches and a height that ranges from 0.25 inch to 1.0 inch;
wherein the wood-type golf club head has a mass ranging from 170 grams to 220 grams.

5. A wood-type golf club head comprising:
a body having a hollow interior and composed of a plurality plies of pre-preg material, the body having a striking plate, a crown, a sole with a bottom portion and a ribbon with an upper wall and a lower wall, wherein the striking plate, the crown and the sole define the hollow interior, the body having a volume ranging from 300 cubic centimeters to 400 cubic centimeters and a mass ranging from 90 grams to 115 grams;
three weight members embedded between the plurality of plies of pre-preg material in the upper wall of the ribbon, each of the three weight members composed of a polyurethane material integrated with tungsten, each of the three weight members has a density ranging from 7 grams per cubic centimeter to 12 grams per cubic centimeter, the three weight members having a combined mass ranging from 40 grams to 60 grams, wherein the three weight members consists of a toe weight member, a heel weight member and a center weight member, each of the plurality of weight members having a length that ranges from 1.5 inches to 3.0 inches and a height that ranges from 0.25 inch to 1.0 inch;
a sole plate composed of a metal material attached to the bottom portion of the sole; and
an internal tube disposed within the hollow interior of the body, the internal tube having a bore for receiving a shaft through an aperture in the crown;
wherein the wood-type golf club head has a mass ranging from 170 grams to 220 grams.

6. A wood-type golf club head comprising:
a body having a hollow interior and composed of a plurality of layers of plies of pre-preg material, the body having a striking plate, a crown, a sole with a bottom portion and a ribbon with an upper wall and a lower wall, wherein the striking plate, the crown and the sole define the hollow interior, the body having a volume ranging from 300 cubic centimeters to 400 cubic centimeters and a mass ranging from 90 grams to 115 grams; and
a plurality of weight members embedded between the plurality of plies of pre-preg material in the upper wall of the ribbon, each of the plurality of the weight members composed of a polyurethane material integrated with tungsten, each of the plurality of weight members having a density ranging from 7 grams per cubic centimeter to 12 grams per cubic centimeter, the plurality of weight members having a combined mass ranging from 40 grams to 60 grams, wherein the plurality of weight members consists of a toe weight member, a heel weight member and a center weight member, each of the plurality of weight members having a length that ranges from 1.5 inches to 3.0 inches and a height that ranges from 0.25 inch to 1.0 inch;
wherein the wood-type golf club head has a mass ranging from 170 grams to 220 grams and a moment of inertia ranging from 2500 grams-centimeter squared to 3500 grams-centimeter squared about the Izz axis through the center of gravity.

* * * * *